US006335438B1

(12) United States Patent
Fonnum

(10) Patent No.: US 6,335,438 B1
(45) Date of Patent: Jan. 1, 2002

(54) METHOD FOR THE MANUFACTURE OF AMINO GROUP CONTAINING SUPPORT MATRICES, SUPPORT MATRICES PREPARED BY THE METHOD, AND USE OF THE SUPPORT MATRICES

(76) Inventor: Geir Fonnum, Asbjørnsvei 40, N-1476 Rasta (NO)

( * ) Notice: Subject to any disclaimer, the term of this patent is extended or adjusted under 35 U.S.C. 154(b) by 0 days.

(21) Appl. No.: 09/273,513

(22) Filed: Mar. 22, 1999

(51) Int. Cl.⁷ .................. C07H 21/00; C07H 21/02; C07H 21/04; C12Q 1/68
(52) U.S. Cl. .................. 536/25.3; 435/6; 536/22.1; 536/25.31
(58) Field of Search ............... 435/6; 536/22.1, 536/25.3, 25.31

(56) References Cited

U.S. PATENT DOCUMENTS

| 3,637,535 A | 1/1972 | Corte et al. ............... 260/2.1 |
| 4,275,184 A | * 6/1981 | Bargain et al. ............ 528/26 |
| 4,373,071 A | 2/1983 | Itakura .................... 525/375 |
| 5,098,960 A | 3/1992 | Frautschi ................. 525/359.3 |
| 5,369,012 A | 11/1994 | Koontz .................... 435/7.92 |

FOREIGN PATENT DOCUMENTS

| EP | 0213896 A3 | | 3/1987 |
| EP | 0213896 A2 | | 3/1987 |
| EP | 0687691 A2 | | 12/1995 |
| EP | 0687691 A3 | | 12/1995 |
| GB | 1579490 | | 11/1980 |
| GB | 2053242 A | | 2/1981 |
| WO | WO 92/07882 | * | 5/1992 |
| WO | WO9400600 | | 1/1994 |

OTHER PUBLICATIONS

Donya et al., Russ. J. Appl. Chem. 71 (1) (1998) 132–137 (translated from Zhurnal Prikladnoi Khimii 71 (1) (1998) 127–32).

Donya et al., Russ. J. Appl. Chem. 67 (3:2) (1994) 400–404 (in English, translated from Zhurnal Prikladnoi Khimii 67 (3) (1994) 450–454).
Donya et al., Ukr. Khim, Zh. (Russ ed.) 56 (9) (1990) 984–990 (in Russian, English abstract attached).
Donya et al., Vysokomol Soedin Ser A Ser B 36 (12) (1994) 2068–2073.
Donya et al., Vysokomol Soedin Ser A Ser B 37 (5) (1995) 752–757 (in Russian, English abstract attached).
Donya et al., Vysokomol Soedin Ser B 34 (8) (1992) 3–8 (in Russian, English abstract attached).
Imoto et al, Bull. Chem. Soc. Jap. 49 (5) (1976) 1342–1345.
Masuda, Makromol. Chem 190 (1989) 1007–1014.
Lewandowski et al., J. App. Polymer Science, vol. 67, 1998, pp. 597–607.
K. Hashimoto et al., J. Polymer Sci.: Part A: Polymer Chemistry 37 (1999, pp. 303–312.

* cited by examiner

*Primary Examiner*—Jezia Riley
(74) *Attorney, Agent, or Firm*—Birch, Stewart, Kolasch & Birch, LLP

(57) ABSTRACT

A method for the manufacture of a support matrix exhibiting amino groups I, possibly in acylated form, comprising the step of polymerizing one or more monovinyl monomers (monomer I) with one or more di- tri- or polyvinyl monomers (monomer II). The method is characterized in that that the polymerization is run in the presence of one or more amino-($C_{0-10}$)hydrocarbon vinyl aromatic monomers possibly in acylated form (monomer III). The preferred combination of monomers are ethyl vinyl benzene, divinyl benzene and amino styrene. The support matrix comprising a polyvinyl backbone $[(-CH_2CH_2)_n]$ and amino groups or groups derived from said amino groups while retaining the nitrogen of the amino group, each of which groups being attached to said backbone via a link structure containing an arylene group. The matrix is characterized in that each of said groups is directly attached via said nitrogen to said arylene group. Additionally, the use of the support matrix for solid phase synthesis, for instance of an oligo/polynucleotide or an oligo/polypeptide.

40 Claims, No Drawings

METHOD FOR THE MANUFACTURE OF AMINO GROUP CONTAINING SUPPORT MATRICES, SUPPORT MATRICES PREPARED BY THE METHOD, AND USE OF THE SUPPORT MATRICES

TECHNICAL FIELD

This invention concerns support matrices comprising a polyvinyl backbone $[(-CH_2CH_2)_n]$ to which amino groups and/or derivatized amino groups are attached via link structures.

The expressions "a derivatized amino group" and "a group derived from an amino group" means that the amino group has been chemically transformed to a group in which the nitrogen remains bound to a link structure.

In earlier known support matrices cross-linking structures and groups containing pure amino groups and derivatized amino groups have replaced hydrogens in the polyvinyl backbone. Hydrogens have also been replaced by other groups, such as alkyls (methyl, ethyl etc), various forms of aryls (such as phenyl, vinyl phenyl, ethyl phenyl etc), acyloxy, aryloxy, alkoxy etc. The groups have been further derivatized.

This type of support matrices can be used as a solid phase in adsorption and partition processes, such as chromatography, and in solid phase organic synthesis, and as support in cell culturing and for catalysts, such as enzymes.

This type of support matrices has previously been prepared by copolymerising mono-vinyl compounds with di-, tri and polyvinyl compounds, with at least one of the monomers containing a functionality that can be transformed to an amino group after the polymerisation. One alternative has been to copolymerise chloromethyl styrene with divinyl benzene followed by treatment with ammonia. Another alternative has been conversion of residual vinyl groups to groups containing an amine function.

It has also been suggested that similar support matrices can be produced by ammonia gas plasma treatment of various polymers containing a polyvinyl backbone. See for instance U.S. Pat. No. 5,369,012. Gas phase plasma treatment gives a more or less random introduction of functional groups on carbon atoms in the backbone or in pending groups.

Another possible method of making similar support matrices is nitration of cross-linked polystyrenes followed by reduction of the nitro groups to amino groups. Nitrations are generally carried out under very harsh conditions leading to a number of side reactions like oxidations. The subsequent reduction step is characterized by relatively low yields resulting in unreacted nitro groups on the polystyrene. In highly cross-linked materials these reactions are very difficult to use successfully. Unwanted nitro groups attached directly on the polyvinyl backbone are obtained in side reactions.

Previously known support matrices thus have been relatively cumbersome to manufacture because of the extra steps necessary for introducing the amine functions and of the side reactions occurring.

For porous matrices carrying amino groups, we have found that the availability of the amino groups in a given matrix often vary. This has not been considered optimal for certain applications, for instance solid phase synthesis of oligonucleotides and adsorption processes.

Commercially available support matrices comprising polyvinyl backbones for use in solid phase synthesis of oligonucleotides are sold with the first monomer attached to the matrix. The loading has been about 90 µmole of the first nucleotide per gram matrix (Primer Support High Load 30; Amersham Pharmacia Biotech AB, Uppsala, Sweden).

If not otherwise specified, the terms nucleotide, dexoxynucleotide, amino acid residue, DNA, RNA, oligo-/polypeptide includes their respective synthetic analogue, such as PNA (WO 9220703) and LNA for DNA.

The terms nucleotide, dexoxynucleotide, amino acid residue, DNA, RNA, oligo-/polypeptide, synthetic analogues thereof such as PNA (WO 9220703), LNA etc includes, if not otherwise specified.

OBJECTS OF THE INVENTION

A first object is to provide a simplified method for manufacturing support matrices carrying amino groups and/or derivatized amino groups, both of which are bound via a link structure to a polyvinyl backbone.

A second object is to provide support matrices that have an improved availability of amino groups and of derivatized forms thereof.

A third object is to provide improved support matrices for solid phase synthesis of oligonucleotides and oligopeptides, said matrices being improved in accordance with the first and second objects and leading to improved yields of a desired oligonucleotide/oligopeptide.

A fourth objective is to provide improved support matrices of the above-mentioned type for use in solid phase synthesis of organic compounds, the improvement being a loading (covalent attachment) of $\geq 100$ µmole, such as $\geq 150$ µmole or even $\geq 200$ µmole of an organic reagent per gram dry matrix. These figures in particular refer to support matrices in which the organic reagent is a nucleotide, deoxynucleotide, or an analogue thereof.

A fifth object is to provide improved support matrices for the solid phase synthesis of organic compounds, with particular emphasis of combinatorial libraries of small organic molecules

THE INVENTION

It has now been recognized that these objects can be met in case one or more amino-($C_{0-10}$)hydrocarbon vinyl aromatic monomers, optionally having the amino group acylated, are copolymerised with other vinyl monomers. In other words essentially all amino groups in the matrix obtained after polymerisation will be of the same type, i.e. either a pure amino group or an acylated form thereof. Essentially no nitro groups or groups derived from side reactions occurring during nitration or during a subsequent reduction of the formed nitro groups to amino groups will be present in the matrix if the corresponding phenyl substituted polyvinyl polymer is nitrated.

The first aspect of the invention thus encompasses a method for the manufacture of a support matrix to which amino groups and/or acylated forms thereof are attached. The method comprises the step of copolymerising one or more monovinyl monomer (monomer I) with one or more di- tri- or polyvinyl monomers (monomer II). The method is characterized in that a part of the vinyl monomers carries an amino-($C_{0-10}$)hydrocarbon group or corresponding amido group (acylated amino) attached to an aromatic ring (monomer III). After the polymerisation the polymer material formed may be collected and further processed. The amino groups and/or acylated forms thereof may subsequently be transformed to a desired functionality. The amino groups may be primary, secondary or tertiary.

The amino-$(C_{0-10})$hydrocarbon group is preferably a pure amino group, such as in amino monovinyl benzenes (for instance amino styrene) and amino vinyl naphthalenes, i.e. with the hydrocarbon group being non-existent. The amino group may be derivatized, such as in amides.

The hydrocarbon group, if present in the amino-$(C_{0-10})$ hydrocarbon group may be straight, branched or cyclic. It may be aromatic or non-aromatic, such as containing a phenylene or consisting of a pure alkylene chain, respectively.

Monomer III is part of monomer I and/or monomer II.

Monomer III may be isoforms of amino-$(C_{0-10})$ hydrocarbon vinyl aromatics in which a vinyl group and an amino-$(C_{0-10})$ hydrocarbon group are orto, meta or para to each other. Monomer III may also comprise amino-$(C_{0-10})$ hydrocarbon vinyl naphthalenes in which either of the vinyl group or the amino-$(C_{0-10})$ hydrocarbon group is in the 1- or 2-position.

The acylated amino group in monomer III complies with the formula $$-NR_1R_2$$

in which $R_1$ and $R_2$ are selected among
  a) hydrogen,
  b) straight, branched and cyclic hydrocarbon groups or corresponding acylated forms.

Each of the hydrocarbon groups may have a hydrocarbon chain of 1–20 carbon atoms, optionally substituted with one or more hydroxy, alkoxy or amino groups and containing a nitrogen, an oxygen or a sulphur atom replacing a carbon atom in the chain.

More specifically $R_1$ and $R_2$ encompass alkyls, aralkyls arylalkyls and aryls, for instance substituted or unsubstituted phenyl containing none, one or more heteroatoms, such as nitrogen or oxygen. Alkoxy is preferably $C_{1-7}$ alkoxy. The nitrogen of an amino group that may be present in an $R_1$ or $R_2$ may carry one or two hydrocarbon groups, such as $C_{1-7}$ alkyl.

One or both of $R_1$ and $R_2$ may be according to (b) above.

Compounds to be used as monomer I are alkenes, acrylates/methacrylates, acrylamides/methacrylamides, acrylnitriles/methacrylnitriles, vinyl aromatics like monovinyl benzenes such as unsubstituted or substituted variants thereof (meta, orto and para isomers), etc. Monomer I may also be an alkyl vinyl benzene, for instance with a $C_{1-10}$ alkyl substituent, such as ethyl. Vinyl ethers, styryl ethers (with the ether oxygen attached to a carbon) etc are other examples. Monovinyl forms of Monomer III with one vinyl group are part of monomer I.

Compounds to be used as monomer II are alkadienes, bisforms of acrylates/methacrylates and acrylamides/methacrylamides, divinyl aromatics like various forms of divinyl benzenes (for instance meta, orto and para). Corresponding forms having more than two vinyl groups may in principle also be used. Monomer II acts as a cross-linker. Monomer II may also be alkylated forms and ether forms of the divinyl monomers just mentioned. Forms of monomer III with two or more vinyl groups are part of monomer II.

In a typical polymerisation mixture the %-amounts are:
  monomer I: $\geq 0.5\%$ such as $\geq 20\%$ and $\leq 99.5\%$, such as $\leq 95\%$
  monomer II: $\geq 0.5\%$ such as $\geq 5\%$ and $\leq 99.5\%$, such as $\leq 80\%$
  monomer III: $\geq 0.5\%$ and $\leq 80\%$ Increasing the %-amount of monomer II will increase the rigidity of the final polymer and reduce the ability to swell in organic solvents.

The exact selection of %-amounts will depend on the use contemplated of the support matrix.

For uses in which the matrix does not need to withstand pressure, for instance from a liquid flow, typical %-amounts are:
  monomer I: $\geq 95\%$ such as $\geq 98\%$ and $\leq 99.5\%$
  monomer II: $\geq 0.5\%$ and $\leq 5\%$ such as $\leq 2\%$
  monomer III: $\geq 5\%$ such as $\geq 15\%$ and $\leq 80\%$ such as $\leq 50\%$ The matrices obtained are of particular importance for most kinds of step-wise solid phase synthesis of organic compounds, except for nucleic acid synthesis.

For uses in which the matrix need to withstand pressure, typical %-amounts are:
  monomer I: $\geq 10\%$ such as $50\%$ and $\leq 90\%$ such as $\leq 80\%$
  monomer II: $\geq 5\%$ such as $\geq 10\%$ and $\leq 80\%$ such as $\leq 50\%$
  monomer III: $\geq 0.5\%$ such as $\geq 2\%$ and $\leq 40\%$ such as $\leq 35\%$ and even $\leq 20\%$ The matrices obtained are of particular importance for applications in which a matrix is placed in a column/vessel and a liquid flow containing reagents is allowed to pass through. Typical uses are chromatographic applications and solid phase synthesis of nucleic acids.

The percentages given above are w/w and calculated on the total amount of polymerisable vinyl monomers in the polymerisation mixture.

The polymerisation conditions will depend on the vinyl monomers used and on demands on the final polymer. Depending on the vinyl polymers used, the polymerisation may be performed as an anionic, a cationic or a free radical polymerisation.

One of the most preferred kind of polymerisations for the invention utilizes free radicals and an initiating system. Initiating systems are electron irradiation, $\gamma$-radiation, radical initiators etc. Typical initiators are chemical, thermal and irradiation initiators. Thermal initiators are often preferred. They have their best efficiency in the range of 30–90° C.

Thermal/chemical initiators are azo compounds (for instance 2,2'-azobis(2,4-dimethylvaleronitrile), azoisonitriles, peroxides (for instance benzoylperoxide), persulphates, different redox systems, for instance Fenton's reagent (hydrogen peroxide+$Fe^{2+}$). Irradiation initiators typically work in the UV region and often have a benzophenone structure or are benzoyl derivatives. If needed the selected initiating system is combined with an appropriate accelerator.

Slow reacting vinyl groups typically require specific precautions. This can be complied with by appropriately selecting initiator-accelerator systems or by utilizing electron radiation as is known in the field. Allyl groups and other alkene groups which have only hydrogens and/or $sp^3$-hybridised carbons bound to the C—C-double bonds are examples of slow reacting vinyl groups.

Polymerisation may take place in conventional o/w-emulsions/suspensions and dispersions to give more or less spherical particles provided the appropriate conditions are applied as known in the field. Similarly also bulk polymerisation may be utilized, possibly with subsequently disintegrating the block into particles, if so found appropriate.

Emulsifiers and stabilizers typical for polymerisations in emulsions, suspensions and dispersions can also be used in the present invention. Well known emulsifiers and stabilizers are sodium dodecyl sulphate, alkylated oligo ethylene glycols, cellulose derivatives etc.

One can also envisage that polymerisations are carried out in so called inverse emulsions (w/o-emulsions) in which the conditions have been selected such that the water droplets break up to a macroporous network having open spherical cavities communicating with each other (water act as a porogen). See for instance EP 60,138 and U.S. Pat. No. 5,200,433. This can be extended to so called w/o/w emulsions in which the inner w/o-emulsion is in form of drops forming HIPEs. See WO 9531485. This kind of emulsions are often called high internal phase emulsions (HIPE).

By including an appropriate porogen into a polymerisation mixture, porous materials in form of particles/beads and monolithic plug material can be accomplished. Porogens typically are compounds that in some way separates out and forms channels/pores when the polymer is formed. Porogens may be in form of liquids, solids or gases and shall be possible to remove after polymerisation. Porogens in form of liquids are typically capable of completely dissolving the monomers used but not the polymer chain created. This means that the polymer chains will separate out and form a polymer material containing a pore system filled with the porogen. The characteristics of the pore system will depend on the amount and type of porogen. In general porogens with solubility parameter values near the solubility parameter value of the polymer results in elastic gel-like porous material with relatively high proportion of smaller pores. Aromatic solvents, such as toluene, xylene, mesitylene etc, have the potential to give this effect in case vinyl aromatics are polymerised.

The use of porogens with larger differences between the solubility parameter value of the porogen and of the polymer often results in more rigid porous material with a lower proportion of smaller pores. This effect will, for vinyl aromatics be obtained with, for instance, alcanols and aliphatic hydrocarbons as porogens. Often used porogens of this type have been alkanes, such as heptane, alkanols, such as decanol. Also mixtures of liquid compounds have been used as porogens.

With respect to vinyl aromatic monomers and oligonucleotide solid phase synthesis, porogens containing liquid aromatic solvents are preferred as porogens, possibly in combination with other liquids that are miscible with them.

Polymers may also be used as porogens

The general principles outlined above for selection of porogen also apply to polymers based on vinyl monomers that are non-aromatic.

The porous materials obtained may have pore sizes, pore volumes and pore surface areas as known in art for vinyl polymers. The pore size diameters thus may be within the interval of 10 Å to 1000 μm. The optimal selection of pore diameters typically depends on the use contemplated and can, for instance, be selected according to rules known in the field.

For certain applications it may be important that a certain fraction of the pores is above or below a certain limit or within a certain interval. It has now been found that for the synthesis on porous solid phases, in particular of oligonucleotides and their analogues, optimal pore size diameters of the support matrix should be in the interval of 10–2000 Å, such as 100–1000 Å, for more than 10%, such as more than 30%, of the pore volume. The best porogens found so far are toluene, xylene and mesitylene for obtaining these pore characteristics in matrices based on vinyl aromatic monomers. Most likely also other solvents having the comparable properties with respect to dissolving vinyl aromatic monomers and to become adsorbed by polymers obtained therefrom may be used.

The pores often are irregular meaning that it often is difficult to estimate their sizes. The figures given above and in the experimental part for pore sizes and pore size distributions refer to values obtained by size exclusion chromatography (SEC) of polystyrenes in tetrahydrofuran and linking the molecular weight of the polystyrenes to pore sizes according to the formula:

$$\phi(\text{Å}) = 0.62(M_w)0.59$$

where $\phi(\text{Å})$ is pore diameter in Å, and $M_w$ is mean molecular weight of the polystyrene. The method approximate irregular pores to cylindrical pores and has been described by Halasz et al (Angew. Chem. Int. Engl. 17 (1978) 901–908) and Halasz et al (Angew. Chem Int. Engl. 19 (1980) 24–28).

In case the material is in particle form, its mean particle size typically is in the range of 1–1000 μm, preferably 3–1000 μm or 3–500 μm, i.e. particle sizes that normally are not obtained by emulsion polymerisation. The particles may have an irregular shape, such as obtained by disintegrating blocks obtained from bulk polymerisations, or spherical (beaded) as obtained from polymerisation in suspensions. The particles may be monodisperse or polydisperse, with monodisperse particle populations having more than 95% of the particles with sizes within their mean diameter ±5%.

A particular important method for manufacturing the particles according to the invention is by utilizing so called seed particles, preferably including a first step comprising swelling the seed particles and then a second step comprising uptake of monomers before polymerisation. See for instance U.S. Pat. No. 4,336,173 which is hereby incorporated by reference. As described in U.S. Pat. No. 4,336,173 this method means i) preparing an aqueous emulsion or dispersion comprising the steps of
   (A) providing a dispersion or emulsion containing seed particles, preferably comprising a polymer and preferably having a diameter <1 μm, and a Substance I which comprises one or more materials having a molecular weight <5000 and a water solubility <$10^{-2}$ gl and being substantially absorbed by said seed particles,
   (B) adding to said dispersion or emulsion of step (A)
      (a) a Substance II which comprises one or more partly water-soluble materials having a water-solubility at least 10 times higher that that of substance I, whereby Substance II diffuses into the seed particles containing Substance I at a rate substantially in excess of the rate of departure of Substance I from said seed particles, the amount of said Substance II diffusing into said particles containing Substance I being at least 20 times that of the original seed particles used in step (A) based on volume, and
      (b) necessary emulsifiers and initiators for polymerisation;
      said Substance I and Substance II comprising materials containing (a) one or more of the monomers polymerisable with included initiators and (b) liquids not being polymerisable under the same conditions as the monomers;
ii) polymerisation by activating the initiator.

Subsequent to the polymerisation according to the present inventive method, the group —NR$_1$R$_2$ may be transformed by methods known in the field to

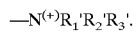
—N$^{(+)}$R$_1$'R$_2$'R$_3$'.

R$_3$' is a group that may or may not be present. (+) means that the nitrogen is positively charged when R$_3$' is present (ammonium form) and uncharged when R$_3$' is absent.

When $R_3'$ is absent, $R_1'$ and $R_2'$ in addition of being selected among the same groups as $R_1$ and $R_2$ may be selected from groups having the formula —A—X in which
(a) A is an organic bridge structure and
(b) X is a structure containing
  (i) one or more reactive groups capable of reacting with a substance carrying a nucleophilic or an electrophilic group or with a free radical to covalently attach said substance or a part thereof to said support matrix, or
  (ii) one or more groups that can be transformed to such a reactive group, or
  (iii) a member of an affinity pair mediating affinity binding of the other member of the pair.

When $R_3'$ is present, the group —$N^{(+)}R_1'R_2'R_3'$ is an ammonium group and carries a positive charge. $R_1'$, $R_2'$ and $R_3'$ are groups providing an amine/ammonium functionality to the nitrogen. They are thus selected among those of $R1'$ and $R_2'$ that provide an $sp^3$-hybridised carbon or an aromatic carbon directly to the nitrogen of —$N^{(+)}R_1'R_2'R_3'$.

Typically A comprises a stable organic chain in which there are one or more organic structural elements selected from (a) straight, branched or cyclic hydrocarbon chains comprising 1–20 carbon atoms, (b) ether, (c) thioether, (d) amide structures, (e) ester, (f) azo, (g) secondary or tertiary amine structures, etc. The preferred structures typically have a hydrolytic stability that is comparable to or higher than acetamide, for instance. In some applications it may be advantageous to include structures having a lowered stability in order to enable selective cleavage at a certain location. See for instance the discussion below about solid phase synthesis of polymers.

By the term "stable" above is contemplated that the organic chain does not unintentionally deteriorate or react with any of the groups present in the inventive support matrix or under the conditions applied during its use.

The structure A may be common for at least two of $R_1'$, $R_2'$ and $R_3'$. Structure A may thus have a terminal group that together with the nitrogen in —$N^{(+)}R_1'R_2'R_3'$ forms —N=N—, —N=C<, —$N^+$≡N etc. In —$N^+$≡N, —A—X is ≡N which means that A and X coincides.

Reactive groups as defined above and present in structure X are well known in the field. Hydroxy, amino, thiol, carboxy etc or activated forms of these groups are typical examples.

Structure X may be a nucleotide or deoxynucleotide or a nucleic acid (DNA, RNA, oligonucleotide, and analogues such as PNA and LNA), which at its 3'-position (the terminal one for oligonucleotides) is linked via A to the support matrix and at its 5'-position (the terminal one for oligonucleotides) is protected or unprotected. If present, amino groups, phosphate groups and hydroxy groups preferably are in protected forms. The 2'-position is preferably protected in case X is a nucleotide.

For the 5'-position a familiar protecting group is dimethoxytrityl (DMtr).

For amino groups present in the base moiety, the optimal protecting group depends on the nucleoside/nucleotide, deoxynucleotide/deoxynucleoside or nucleic acid concerned. Typical amino protecting groups for deoxy forms are: adenosine—benzoyl/phenoxyacetyl, cytosine—benzoyl/isobutyryl/acetyl, guanine—isobuturyl/isopropyl phenoxyacetyl, tymidine—none, and for nucleosides/nucleotides: adenosine—phenoxyacetyl, cytosine—acetyl, guanosine—isopropylphenoxy acetyl, uracil—none.

A typical phosphate protecting group is β-cyanoethyl. In certain variants a phosphate oxygen may be replaced with sulphur, i.e. in an oligonucleotide chain, the phosphate group may be —P(—S)(=O)—[—P(=S) (—$O^-$)—].

For the 2'-position of the sugar moiety, t-butyldimethylsilyl is a typical protecting group.

The organic structure A is selected so that the reaction cycles in oligonucleotide solid phase synthesis can be performed without releasing the growing oligonucleotide chain, i.e. the structure A is stable under the various steps up to the final release step.

For oligonucleotide synthesis and the like, structure A typically provides an ester function to the 3'-position of the first nucleotide of the growing nucleotide chain while the other structural elements of A are more stable. Other structural elements in A thus may be amide, pure hydrocarbon chain, ether, thioether etc. In an alternative, the ester group may be replaced with a single or repetitive silyl ether structure. See for instance WO 9209615 and WO 9808857 which hereby are incorporated by reference. It is however obvious to one who is skilled in the art that many other variants of structure A also fall within the scope of this invention.

X may also be an amino acid residue or an oligopeptide linked at its carboxy end to a support matrix as defined above. The α-amino group may be protected or unprotected as known in the field. If present, other carboxy groups and other amino groups and also thiol group are preferably protected in a manner known in the field. The stability requirements for the bridge structure A are in this case different from those valid for solid phase oligonucleotide synthesis, but well known to people in the field.

X may also be a member of a so called affinity pair and used to affinity bind ("affinity adsorb") the other member of the pair to the support matrix. Well-known affinity pairs are (a) positively and negatively entities (ion exchange; with groups selected among primary, secondary, tertiary and quaternary ammonium, sulphonate, sulphate, phosphonate, phosphate and carboxy bound covalently to a support matrix), (b) antibodies and antigens/haptens, (c) lectins and carbohydrate structures, (d) IgG binding proteins and IgG etc. This kinds of Xs are often used in aqueous solutions and the selectivity and specificity in binding may often be disturbed in case the contact surface between the aqueous medium and the solid phase is hydrophobic. Thus, in this mode of the invention it is often important to hydrophilize the surface, for instance by having hydroxyl group containing entities attached as A which in turn may exhibit X, i.e. the member of the affinity pair. Hydrophilization procedures and procedures for covalently linking affinity binders to solid phases are well known in the field.

The second aspect of the invention is a support matrix comprising
(a) a polyvinyl backbone [(—$CH_2CH_2$)$_n$] and
(b) one or more amino groups or groups derived from amino groups while retaining the nitrogen of the amino group.

These groups are attached to said backbone via a link structure containing an arylene group.

A part of the hydrogens of the backbone may be replaced as discussed in the introductory part (page 1).

The matrix of the second aspect of the invention is characterized in that each of said amino groups is directly attached via its nitrogen to the arylene group.

In the preferred variants the amino groups and groups derived therefrom comply with the structure:

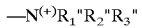

$R_1''$, $R_2''$ and $R_3''$ are selected from the same groups as $R_1'$, $R_2'$ and $R_3'$. (+) has the same meaning as above.

The inventive support matrices typically have a content of —$N^{(+)}R_1'R_2'R_3'$ groups in the interval 0.01–6 mmole/g of the polymer, with preference for 0.1–4 mmole/g. These figures in particular apply to the support matrices as they are obtained from the polymerization, i.e. the amino groups are —$NR_1R_2$.

The preferred variants of the second aspect require the backbone to be cross-linked. Cross-linking may have been accomplished as known in the field, either by including monomers having two or more vinyl groups in the polymerisation process or by a separate cross-linking after the polymerisation by the use of bifunctional electrophilic/nucleophilic cross-linking agents.

Typically, there are essentially no nitrogens directly attached to the backbone according to the second aspect, i.e. an essential part of the $-N^{(+)}R_1''R_2''R_3''$ groups are attached to the backbone via a link structure, preferably comprising an arylene group. In the preferred variants there are essentially no nitro groups or groups derived from side reactions created as a consequence of a nitration and subsequent reduction of nitro groups to amino groups.

Variants in which —$N^{(+)}R_1R_2''R_3''$ derives from a nitrogen-containing group introduced by gas plasma treatment (ammonia or a gaseous analogues thereof) of a support matrix comprising the above-mentioned backbone are excluded from the preferred variants of this aspect of the invention.

Except for the location of the group —$N^{(+)}R_1''R_2''R_3''$ directly on an aryl moiety, the matrix of the second aspect of the invention may have any of the features discussed above for the matrices manufactured according to the first aspect of the invention.

A third aspect of the invention is a method for using the support prepared by the method of the invention in the various fields indicated in the introductory part above. In principle the various steps for each respective use are per se known, without exclusion of future developments.

One use is the step-wise solid phase synthesis of an organic compound. Typically the synthesis is also cyclic. The organic compound may be a polymer composed of one or more different analogous difunctional monomers. By the term difunctional is contemplated that one function in a monomer can participate in a nucleophilic/electrophilic displacement reaction with the second function. When running this type of reaction in a cyclic mode such that the reaction product of one cycle is used as the starting compound in the next cycle, a polymer chain composed of various monomers in sequence will be formed. For each cycle one monomer unit is added to the growing polymer chain that is anchored at one end to the support matrix. A typical protocol comprises:

1. Providing a support matrix as defined above carrying an X which comprises one of the monomers linked to the support matrix via one of its functional groups while the second functional group is protected,
2. If applicable deprotecting the second functional group,
3. Reacting said second functional group with a monomer that is activated at its first functional group, and protected at its second functional group.
4. Repeating steps 2–3 a predetermined number of times with the same or different monomer,
5. Optionally deprotecting and releasing the formed polymer from the support.

In case the monomers used contain further functional groups that can participate in the reactions, they are appropriately protected. Typically, washing steps are included between steps 1–5.

This mode of the invention is useful, among others, for the solid phase synthesis of regular and modified oligonucleotides (DNA, RNA, PNA (WO 9220703), LNA etc) and oligopeptides.

There should be no free nucleophilic groups in A or in the support matrix capable of giving side reactions with the reagents used. Typical prohibited groups are OH— or amino groups, The synthesis of nucleic acids (for instance DNA or RNA oligonucleotides and analogues) on support matrices are known in the field. Thus starting from a support matrix carrying an X that is equal to a protected nucleoside/deoxynucleoside, a typical protocol comprises:

1. Deprotecting the 5'-protected deoxynucleoside/deoxynucleotide linked to the support matrix,
2. Reacting the 5'-deprotected deoxynucleoside with an activated amidite of a desired 5'-protected deoxynucleoside,
3. Oxidating the phosphite group linking the deoxynucleoside deprotected in step 1 to the deoxynucleoside introduced in step 2 to a phosphate group or a thiophosphate group,
4. Capping of unreacted 5'-deprotected deoxynucleoside,
5. Repeating steps 1–4 a predetermined number of times with the same or a different deoxynucleoside in each cycle.
6. Deprotecting and releasing the produced DNA (oligonucleotide) from the matrix.

Typically there are also washing steps between steps 1–6. Except for steps 3 and 6 all steps are run under anhydrous conditions, typically in acetonitrile (steps 1, 2, and 4). The procedure for RNA synthesis is analogous, with nucleosides replacing deoxynucleosides. Provided that the conditions are kept fully anhydrous under step 2, the amount of amidite added may be down to 1.5 equivalents of the first monomer attached to the matrix.

The protocols for oligonucleotide synthesis are mostly run in columns/vessels in which a support matrix in form of particles packed to a bed has been placed. The reagent and washing solutions are then allowed to pass through the column, preferably in plug flow. The matrix is typically in form of porous particles, preferably monodisperse as defined above. For suitable pore size diameters see above.

For a review on oligonucleotide synthesis on solid phase, see Sanghvi Y S et al.; "Chemical Synthesis and Purification of Phosphothioate Antisense Oligonucleotides", In: "Manual of Antisense Methodology" G Hartman and S Endrés (Eds) Kluwer Academic Publishers (1998) pages 1–19. See OligoPilot User Manual, Amersham Pharmacia Biotech AB, in particular chapter 4.

The protocols for oligopeptide synthesis are analogous to the protocols for oligonucleotide synthesis. Thus starting from a support matrix carrying an x that is equal to an amino acid residue protected at its α-amino group and running, the a typical protocol comprises:

1. Deprotecting the α-amino group of the lastly introduced amino acid residue;
2. Reacting the amino group deprotected in step 1 with a properly protected and activated amino acid derivative;
3. Repeating steps 1–2 a predetermined number of times with the same or different amino acid;
4. Deprotecting and releasing the oligopeptide formed from the support matrix.

See further Peptidsyntese: Miklos Bodanszky Peptide Chemistry Springer Verlag 1988.

In case the support matrices as defined above are used for affinity adsorption, X is a member of an affinity pair as defined above. The use comprises bringing the support matrix and a liquid, typically an aqueous liquid, containing the other member of the affinity pair in contact with each other. The conditions are selected to promote affinity binding and are in principle regarded as per se known in the field. Subsequently the support matrix is separated from the liquid and if so desired the affinity adsorbed member can be released and further processed.

A fourth aspect of the invention comprises a nucleoside/nucleotide, a deoxynucleoside/deoxynucleotide, oligonucleotide, or an analogue of these compounds, attached at its 3'-position (terminal for oligonucleotide) via a linker structure B to a porous support matrix composed of a polyvinyl backbone. The attached entity is preferably protected at 2'-, amino- and phosphate positions and protected or unprotected at the 5'-position (terminal for oligonucleotide). In this aspect of the present invention, the support matrix is characterized in that the pore size diameters are within the interval of 10–2000 Å, such as 100–1000 Å, for more than 10%, such as more than 30%, of the pore volume. See above. In a preferred variant the particles may be monodisperse as defined above having a mean diameter in the interval 5–100 μm with preference for 10–50 μm. The linker structure B provides a group binding to the 3'-position in the same way as described above for the second aspect of the invention. Structure B plus the nucleoside/nucleotide, the deoxynucleoside/deoxynucleotide or the oligonucleotide may or may not be part of the group —$N^{(+)}R_1"R_2"R_3"$ which is linked via an arylene to the polyvinyl backbone.

EXPERIMENTAL PART

Polymerisations

Monomers:

Divinylbenzene (technical grade) containing 80% (w/w) meta and para divinyl benzene and 20% (w/w) mainly meta and para ethyl vinyl benzene. Styrene (technical grade). Amino vinyl benzene (aminostyrene, vinylanilin) was from Oakwood (USA). Monomer I: meta and para ethyl benzene+amino vinylbenzene (monomer III)+optionally also styrene. Monomer II: meta and para divinyl benzene.

Polymerisation principle:

Seed particles around 0.5 μm in diameter was prepared by polymerising styrene in emulsion to give polymer chains of relatively short length. The seed particles were swelled in a two step procedure with addition of toluene as porogen plus monomers (technical grade of divinyl benzene, amino vinyl benzene, styrene) plus an azoinitiator, and polymerized. Appropriate stabilizators was included. The system was selected to give monodisperse final particles of size 30 μm. The procedure was as outlined in U.S. Pat. No. 4,336,173.

| Lot | Divinyl benzene added % w/w | Styrenes* added % w/w | amino added % w/w | vinyl mmol /g** | benzene mmol /g*** | Porosity % volume |
|---|---|---|---|---|---|---|
| 1 | 64 | 16 + 0 | 20 | 1.67 | 1.74 | 70 |
| 2 | 50 | 12.5 + 27.5 | 10 | 0.84 | 0.88 | 70 |
| 3 | 64 | 16 + 10 | 10 | 0.84 | 0.92 | 70 |
| 4 | 40 | 10 + 30 | 20 | 1.67 | 1.69 | 70 |
| 5 | 30 | 7.5 + 42.5 | 20 | 1.67 | 1.72 | 70 |
| 6 | 30 | 7.5 + 52.5 | 10 | 0.84 | 0.97 | 70 |
| 7 | 20 | 5 + 55 | 20 | 1.67 | 1.57 | 70 |

-continued

| Lot | Divinyl benzene added % w/w | Styrenes* added % w/w | amino added % w/w | vinyl mmol /g** | benzene mmol /g*** | Porosity % volume |
|---|---|---|---|---|---|---|
| 8 | 64 | 16 + 10 | 10 | 0.84 | 0.98 | 78 |
| 9 | 40 | 10 + 40 | 10 | 0.84 | 0.94 | 78 |

*Styrenes means ethyl styrenes as part of technical grade of divinyl benzene plus technical grade of styrene.
**mmole amino groups added per total amount of monomers in grams.
***mmole nitrogen (amino groups) of the obtained particles based on elemental analysis.
% w/w is based on total amount of monomers.
Porosity values are based on percentage of toluene included in the polymerisation mixture.

Analysing pore size distribution by the use of polystyrenes in tetrahydrofuran, it was found that 48–61% of the pore volumes of lots 1–7 were in pores with pore size diameters within the interval of 115–880 Å constituting more than 30% of the pore volume.

Oligonucleotide Synthesis

Introduction of 5'-protected Deoxynucleotide on the Support Ices:

This was done by first succinylating the selected dexynucleotide at its 3'-position (DMTr-protected at the 5'-position and appropriately protected at the amino group, if present). The obtained mono ester of succinic acid was activated with isobuturyl chloro formiate and coupled to a support matrix containing amino groups. The loading was determined by release of the DMTr-compound and measurement of this compound by UV/VIS. Initially it was found that support matrices (particles) of lot 1 (70% porogen) could be loaded with up to 0.344 mmole nucleotide per gram particles. The remaining amino groups are probably inaccessible for coupling possibly by being present in too small pores or embedded within the polymeric material.

Synthesis of Oligonucleotides

This was performed automatically on Oligo PilotII (Amersham Pharmacia Biotech AB, Uppsala, Sweden). Starting from DMTr-protected nucleotide support, the synthesis comprises the steps of:

1. Hydrolysis of dimethoxytrityl by 3% (v/v) dichloroacetic acid in dichloromethane;
2. Acetonitrile wash;
3. Addition of 0.45 M tetrazole in acetonitrile and amidite in acetonitrile (1.5 equivalents with regard to starting nucleotide on the support);
4. Acetonitrile wash;
5. Oxidation of phosphite by 50 MM $I_2$ in 10% water and 90% pyridine (v/v %);
6. Acetonitrile wash;
7. Capping of unreacted hydroxy groups that have not reacted with the amidite. Equal amounts of solution A (20% of N-methylimidazole in acetonitrile) and solution B (20% acetic acid anhydride in 30% 2,6-dimethylpyridine and 50% acetonitrile.
8. Acetonitrile wash.

For synthesis of a 20-mer, 19 cycles of steps 1–8 was run before the oligonucleotide was fully deprotected and released from the support matrix.

When weighing together all features of the produced particles (swellability, rigidity, loading capacity, yield of oligonucleotide synthesis, costs etc) the support matrix of lot 6 was considered optimal at the priority filing and used as the first prototype there were indications that still improved oparticles could be obtained by further increasing the content of porogen (toluene).

What is claimed is:

1. A method for the manufacture of a support matrix having a polyvinyl backbone and having amino groups, which are optionally in an acylated form, comprising the step of
polymerising one or more monovinyl monomers (monomer I) with one or more di- tri- or polyvinyl monomers (monomer II), wherein at least one of said monomers being a vinyl aromatic monomer, wherein the polymerisation is run in the presence of one or more amino vinyl aromatic monomers, which are optionally in acylated form, (monomer III),
wherein the amount of monomers are
monomer I: $\geq 0.5\%$ and $\leq 99.5\%$
monomer II: $\geq 0.5\%$ and $\leq 99.5\%$
monomer III: $\geq 0.5$–$80\%$
of the total amount of polymerisable vinyl monomers in the polymerisation mixture.

2. The method according to claim 1, wherein monomer III is one or more amino vinyl aromatic monomers.

3. The method according to claim 1, wherein said polymerisation is carried out in the presence of a porogen.

4. The method according to claim 1, wherein said polymerisation is carried out in the presence of a liquid porogen that completely dissolves the monomers used but not the polymer chain created.

5. The method according to claim 3, wherein said monomers are vinyl aromatics and said porogen contains an aromatic solvent.

6. The method according to claim 1, wherein said polymerisation is run as a bulk polymerisation.

7. The method according to claim 1, wherein the polymerisation is carried out in an aqueous emulsion, suspension or dispersion in which the monomers are present in the drops/particles.

8. The method according to claim 1, further comprising the step of
i) preparing an aqueous emulsion or dispersion comprising monodisperse seed particles containing ingredients necessary for polymerization including monomer I and II.

9. The method according to claim 1, wherein said amino groups of monomer III, which are optionally in acylated form, have the formula

in which $R_1$ and $R_2$ are selected from the group consisting of hydrogen; straight, branched or cyclic hydrocarbon groups; and straight, branched or cyclic acyl groups, wherein each of said groups contain a hydrocarbon chain of 1–20 carbon atoms, wherein the hydrocarbon chain is optionally substituted with one or more hydroxy, alkoxy or amino groups and optionally contains a nitrogen, oxygen or sulphur atom replacing a carbon atom.

10. A support matrix comprising a crosslinked polyvinyl backbone and amino groups or groups derived from said amino groups which retains the nitrogen of the amino group, each of said groups being attached to said backbone via a link structure containing an arylene group, wherein each of said groups is directly attached via its nitrogen to said arylene group.

11. The support matrix according to claim 10, wherein said amino groups are aminoaryl groups which replace a hydrogen in the polyvinyl backbone.

12. A support matrix comprising a crosslinked polyvinyl backbone and amino groups or groups derived from said amino groups which retains the nitrogen of the amino group, each of said groups being attached to said backbone via a link structure containing an arylene group, wherein each of said groups is directly attached via its nitrogen to said arylene group; wherein said amino groups or groups derived from said amino groups are present in an amount of 0.01–6 mmole/g dry support matrix.

13. The support matrix according to claim 10, wherein said support matrix is porous.

14. The support matrix according to claim 10 said matrix is in form of monodisperse or polydisperse particles or in form of a monolithic plug, said particles having a mean size within the range of 3–1000 $\mu$m.

15. The support matrix according to claim 10, wherein said support matrix is porous and the pore size diameters are for more than 10% of the pore volume.

16. The support matrix of claim 10, wherein a plurality of said amino groups or groups derived from said amino groups contains a group —A—X in which A is an organic bridge binding to said nitrogen and X is a structure containing
(i) one or more reactive groups capable of reacting with a substance having a nucleophilic or an electrophilic group or with a free radical to covalently attach said substance or part thereof to said support matrix or
(ii) one or more groups that can be transformed to such a respective reactive group, or
(iii) a member of an affinity pair mediating affinity binding of the other member.

17. The support matrix of claim 16, wherein X is a nucleoside, a deoxynucleoside, or an oligonucleotide attached to A at an available 3'-position, having the available 5'-position protected or unprotected and if present having remaining hydroxy or amino groups protected.

18. A support matrix comprising a polyvinyl backbone to which a nucleoside/nucleotide, a deoxynucleoside/deoxynucleotide or an oligonucleotide is attached via an available 3'-position while having the available 5'-position protected or unprotected and, if present, having remaining hydroxy or amino groups protected, wherein said support matrix is porous and the pore size diameters are within the range of 10–2000 Å, for more than 10%, of the pore volume.

19. The support matrix of claim 18, wherein said matrix is in form of a monodisperse particle population.

20. The support matrix of claim 18, wherein said matrix has a loading of >100 $\mu$mole, of a single monomer unit of a polymer, per gram of dry matrix.

21. Method for solid phase synthesis of an oligo/polynucleotide or an oligo/polypeptide utilizing an amino group containing support matrix as the solid phase, wherein the support matrix comprises a polyvinyl backbone and amino groups or groups derived from said amino groups which retains the nitrogen of the amino group, each of said groups being attached to said backbone via a link structure containing an arylene group, wherein each of said groups is directly attached via its nitrogen to said arylene group.

22. The method according to claim 1, wherein the vinyl aromatic monomer is a vinyl benzene.

23. The method according to claim 2, wherein the amino vinyl aromatic monomer is an amino monovinyl benzene.

24. The method according to claim 5, wherein the aromatic solvent is toluene, xylene or mesitylene.

25. The support matrix of claim 11, wherein the amino aryl groups are amino phenyl groups.

26. The support matrix of claim 14, wherein the particles are spherical or spheroidal.

27. The support matrix of claim 14, wherein the particles have a mean size of 5–500 μm.

28. The support matrix according to claim 15, wherein the pore size diameters are 100–1000 Å.

29. The support matrix according to claim 15, wherein the pore size diameters are 10–2000 Å for more than 30% of the pore volume.

30. The support matrix according to claim 15, wherein the pore size diameters are 100–1000 Å for more than 30% of the pore volume.

31. The support matrix according to claim 18, wherein the pore size diameters are 100–1000 Å.

32. The support matrix according to claim 18, wherein the pore size diameters are 10–2000 Å for more than 30% of the pore volume.

33. The support matrix according to claim 18, wherein the pore size diameters are 100–1000 Å for more than 30% of the pore volume.

34. The support matrix of claim 20, wherein said matrix has a loading of greater than or equal to 150 μmole of a single monomer unit of a polymer per gram of dry matrix.

35. The support matrix of claim 20, wherein said matrix has a loading of greater than or equal to 200 μmole of a single monomer unit of a polymer per gram of dry matrix.

36. The support matrix of claim 20, wherein the polymer is a nucleotide/nucleoside or the deoxynucleotide/deoxynucleoside.

37. The support matrix according to claim 14, wherein said monodisperse particles have more than 95% of the particles within ±5% of a mean diameter and polydisperse particles do not have more than 95% of the particles within ±5% of a mean diameter.

38. The support matrix according to claim 19, wherein said monodisperse particles have more than 95% of the particles within ±5% of a mean diameter.

39. The method according to claim 1, wherein said amino groups or groups derived from said amino groups are present in an amount of 0.01–6 mmole/g dry support matrix.

40. The support matrix according to claim 18, wherein the polyvinyl backbone is linked to an arylamine group.

* * * * *

UNITED STATES PATENT AND TRADEMARK OFFICE
CERTIFICATE OF CORRECTION

PATENT NO. : 6,335,438 B1
DATED : January 1, 2002
INVENTOR(S) : Geir Fonnum

Page 1 of 1

It is certified that error appears in the above-identified patent and that said Letters Patent is hereby corrected as shown below:

<u>Title page,</u>
Insert -- Assignee: Amersham Pharmacia Biotech AB; Uppsala, Sweden --

Signed and Sealed this

Twenty-eighth Day of May, 2002

Attest:

JAMES E. ROGAN
*Director of the United States Patent and Trademark Office*

*Attesting Officer*